June 10, 1958     J. A. RYALL     2,838,628

AUXILIARY PEDAL FOR AUTOMOBILE DIMMER SWITCHES

Filed Nov. 13, 1956

INVENTOR,
James A. Ryall
BY Weatherford & Weatherford
attys

United States Patent Office

2,838,628
Patented June 10, 1958

2,838,628

AUXILIARY PEDAL FOR AUTOMOBILE DIMMER SWITCHES

James A. Ryall, West Memphis, Ark.

Application November 13, 1956, Serial No. 621,933

5 Claims. (Cl. 200—61.89)

This invention relates to certain new and useful improvements in controls particularly adapted for effecting so-called "dimming" of automobile headlights.

As is conventional, automobiles are provided with headlights in which the beams of light are controlled as to the elevation of projection by a suitable switching so that the light beams may be shifted from a high position in which the beams project more nearly horizontally to a low position in which the beams are deflected toward the roadway surface. Particularly in highway driving, it is desirable to utilize the beams of the headlights in the high position, but as such high beams have a blinding effect on oncoming drivers, it is desirable that, upon the approach of an oncoming vehicle, the headlights be dimmed, which is accomplished by effecting shift of the beam projection to the down position. For this purpose automobiles are conventionally provided with a button switch member, with the button projecting through the floorboard in adjacency to but offset from other controls. Such conventional dimmer button is frequently difficult to locate under the stress of close attention to problems of driving, and the use of same is accordingly rendered inconvenient and at times even dangerous, since failure readily to find such dimmer button may so divert attention from driving as to permit the creation of dangerous situations.

The present invention contemplates a new and novel auxiliary pedal means by which the foregoing problems in the use of conventional dimmer switch buttons may be obviated and substantially eliminated.

The principal object of the present invention is to provide in combination with a dimmer switch button an auxiliary control pedal facilitating the use of the dimmer button.

A further object of the invention is to provide such a control pedal which is hinged to the automobile floorboard and extends transversely of the automobile, providing an elongated control surface engageable for depressing a dimmer switch.

A further object of the invention is to provide such a pedal which overlies and closely embraces a dimmer button, and includes means preventing lateral movement of the control pedal relative to the dimmer button.

A further object of the invention is to generally improve the design, construction and efficiency of controls for dimming automobile headlights.

The means by which the foregoing and other objects of the present invention are accomplished and the manner of their accomplishment will be readily understood from the following specification upon reference to the accompanying drawings, in which.

Figure 1:
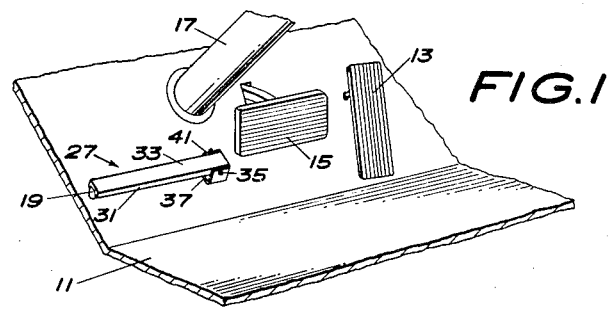
Fig. 1 is a fragmentary perspective view of a portion of the interior of an automobile showing a typical installation of the present invention.

Referring now to the drawings in which the various parts are indicated by numerals, the present invention is adapted for use in a conventional automobile which may include a floorboard 11, an accelerator pedal 13, a brake pedal 15, and a steering column 17, the pedals and column being mounted in relation to the floorboard. Additionally, the automobile includes a headlight dimmer switch button 19 mounted to project through floorboard 11 in transversely offset relation to the other controls, and being conventionally reciprocable so that upon depression of the switch button 19 a switching is effected of the circuits to the automobile headlights, not shown. The switch button 19, as best shown in Fig. 2, may include a cap 21 reciprocable relative to a post 23 and effecting alternate change in the circuits involving the leads 25.

An auxiliary pedal 27 preferably comprises a main body 29, which is preferably of channel shape, and includes depending lateral flanges 31. Preferably pedal 27 additionally includes a cover 33 which is preferably formed of rubber or other suitable anti-slip material, and which is affixed to the elongated upper surface of body 29. Pedal 27 is a relatively elongated pedal, and at or adjacent one end is hingedly connected as by a hinge pin 35 to a bracket 37.

Preferably bracket 37 is a substantially U-shaped member and the web of the U-shaped member is seated against floorboard 11 and is connected thereto as by screws 39, the bracket 37 being thus mounted to the floorboard, as best shown in Fig. 1, in adjacency to, but below, the steering column 17. The legs 41 of bracket 37 project upwardly from the floorboard and embrace the depending flanges 31 of pedal 27, with hinge pin 35 extending through legs 41 and flanges 31 to hingedly interconnect pedal 27 to bracket 37. It will be observed that pedal 27 is supported at said one end by the hinge connection in an elevated position spaced above floorboard 11, and that the flanges 31 of pedal 27 are relatively shallow and are of less depth than the legs 41 of bracket 37.

Figure 2:
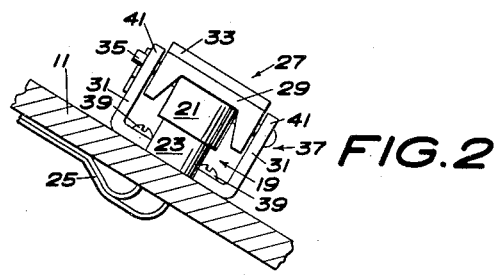
Fig. 2 is an end view on an enlarged scale of the device in use position, with a fragment of the floorboard being shown in section.
Figure 3:
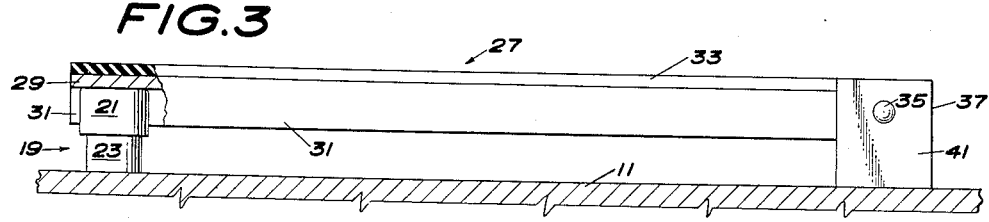
Fig. 3 is a side view of the device as seen in Fig. 2, with parts broken away for purposes of illustration.

Pedal 27 extends transversely of the automobile away from bracket 37 to overlie cap 21 of dimmer button 19, with the opposite ends of flanges 31 closely embracing the dimmer button and with the body 29 of pedal 27 resting on and supported by the dimmer button, as best shown in Fig. 2. It will be observed that the close embracement of dimmer button 19 by flanges 31 limits lateral movement of pedal 27 relative to the dimmer button, and accordingly insures maintenance of positioning of the pedal in engagement with the dimmer button.

As can be clearly seen pedal 27 may be easily depressed by pressure anywhere along the upper surface of the pedal, which, as above stated, is preferably covered by the rubber layer 33, the flanges 31 being, as stated, of shallow depth to permit the pedal to be swung through an arc about hinge pin 35 of sufficient length to effect switch operating depression of dimmer button 19. The dimmer button provides conventional return means usually in the nature of a compression spring (not shown) for restoring the dimmer button to elevated position, and this spring means has proven adequately effective to likewise return pedal 27 to a position substantially parallel to floorboard 11 and elevated away from the floorboard. It thus will be seen that the present invention provides a convenient pedal device upon which the foot of the driver may safely be rested, and which is immediately available to effect switching of the headlamps of the automobile through operation of the dimmer button.

Figure 4:
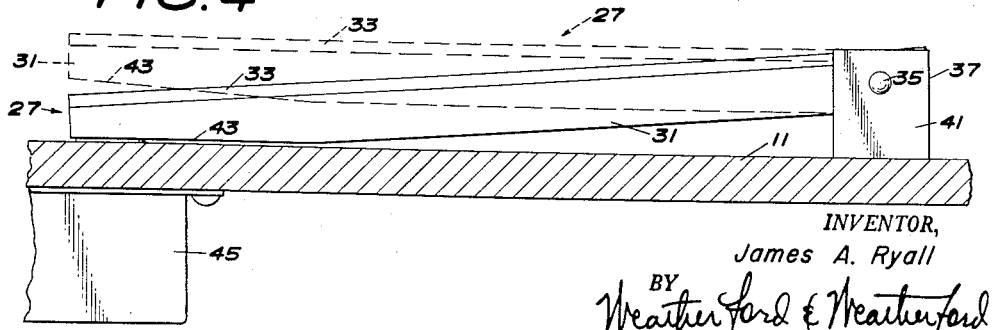
Fig. 4 is a side view illustrating a modification in the present invention.

In Fig. 4 a modification of the present invention is illustrated in which flanges 31 adjacent the button embracing end of pedal 27 are cut off as at 43 to provide a surface which angularly interescts the lower edge of flanges 31, and which is adapted to permit a somewhat greater arc of movement of the pedal under depressing action. It will be observed that in the elevated position indicated in dotted lines in Fig. 4, the lower edge of flange 31 is substantially parallel to floorboard 11; while in the depressed position shown in full lines in Fig. 4, the pedal may be swung through an arc until the edge portions 43 are moved into substantial parallelism and close adjacency to floorboard 11. This modification in the device is particularly adaptable for certain types of dimmer button switches having a somewhat longer throw and employed to actuate a switch contained as in a switch box 45.

Preferably the body and flanges of pedal 27 are formed of light weight material such as cast aluminum since it is found that, while such material enables the dimmer button return means to return the pedal to elevated position, the weight thereof is sufficient to bias the pedal by gravity into button-supported engagement, which engagement is enhanced by button-embracing flanges 31. Additionally, flanges 31 preferably extend throughout the length of pedal 27 and serve adequately to rigidify the pedal against strains encountered in use.

Under some circumstances it may prove desirable temporarily to disengage the pedal from the dimmer button, at which time the pedal may be lifted away from the button and swung through an arc in excess of one hundred eighty degrees to rest in inverted position on floorboard 11, thus conveniently freeing the button as for examination, repair or otherwise.

I claim:

1. In an automobile which includes a steering column and a reciprocable button switch member transversely offset from said column and adapted for depression under foot pressure to effect switching of headlight beams, auxiliary control means for said switch member comprising an elongated pedal member supported at one end on said button member, a substantially U-shaped bracket secured to said automobile adjacent said steering column, means hingedly connecting the other end of said pedal to said bracket, said pedal including opposite flanges embracing said button member and limiting lateral movement of said pedal relative to said button member, said pedal including a body portion extending transversely of said automobile from said bracket to said button member, whereby to provide elongated means for transmitting foot pressure to said button member to effect depression thereof.

2. In an automobile which includes a steering column and a reciprocable button switch member transversely offset from said column and adapted for depression under foot pressure to effect switching of headlight beams, auxiliary control means for said switch member comprising an elongated pedal member supported at one end on said button member, a substantially U-shaped bracket secured to said automobile adjacent said steering column, said bracket embracing the other end of said pedal, hinge means hingedly connecting the other end of said pedal to said bracket, said pedal including opposite flanges embracing said button member and limiting lateral movement of said pedal relative to said button member, said pedal including a body portion extending transversely of said automobile from said bracket to said button member, whereby to provide elongated means for transmitting foot pressure to said button member to effect depression thereof.

3. In an automobile which includes a floorboard, a steering column mounted to said floorboard, and a reciprocable button switch member projecting from said floorboard transversely offset from said column and adapted for depression under foot pressure to effect switching of headlight beams, auxiliary control means for said switch member comprising an elongated transversely extending pedal member supported at one end on said button member elevated above said floorboard, a substantially U-shaped bracket secured to said floorboard adjacent said steering column, means hingedly connecting the other end of said pedal to said bracket in position elevated above said floorboard, said pedal including a body portion extending transversely of said automobile from said bracket to said button member, whereby to provide elongated means for transmitting foot pressure to said button member to effect depression thereof.

4. In an automobile which includes a floorboard, a reciprocable button switch member projecting from and offset to one side of said floorboard and adapted for depression under foot pressure to effect switching of headlight beams, auxiliary control means for said switch member comprising an elongated pedal member supported at one end on said button member, a bracket secured to said floorboard transversely inset from said button member, means hingedly connecting the other end of said pedal to said bracket, said pedal including opposite flanges having edges extending longitudinally of said pedal, said flanges embracing said button member and limiting lateral movement of said pedal relative to said button member, said pedal flanges adjacent said button including angularly disposed edge portions extending longitudinally of said pedal and angularly intersecting said flange edges, said pedal including a body portion extending transversely of said automobile from said bracket to said button member, whereby to provide elongated means for transmitting foot pressure to said button member to effect depression thereof.

5. In an automobile which includes a floorboard, and a reciprocable button switch member projecting from said floorboard adapted for depression under foot pressure to effect switching of headlight beams, auxiliary control means for said switch member comprising an elongated transversely extending pedal member supported at one end on said button member elevated above said floorboard, a substantially U-shaped bracket secured to said floorboard, means hingedly connecting the other end of said pedal to said bracket in position elevated above said floorboard, said pedal including a body portion extending transversely of said automobile from said bracket to said button member, whereby to provide elongated means for transmitting foot pressure to said button member to effect depression thereof.

References Cited in the file of this patent

UNITED STATES PATENTS

| | | |
|---|---|---|
| 1,612,852 | Bolton | Jan. 4, 1927 |
| 2,638,517 | Zarski | May 12, 1953 |